United States Patent [19]

Kita

[11] Patent Number: 4,654,524

[45] Date of Patent: Mar. 31, 1987

[54] METHOD AND APPARATUS FOR MEASURING A DISPLACEMENT OF ONE MEMBER RELATIVE TO ANOTHER USING A VERNIER WITH AN EVEN NUMBERED DIFFERENCE OF ELEMENTS

[75] Inventor: Yasuo Kita, Kyoto, Japan

[73] Assignee: Shimadzu Corporation, Kyoto, Japan

[21] Appl. No.: 533,779

[22] Filed: Sep. 19, 1983

[30] Foreign Application Priority Data

Sep. 20, 1982 [JP] Japan .................................. 57-163574
Sep. 20, 1982 [JP] Japan .................................. 57-163575

[51] Int. Cl.$^4$ .............................................. G01D 5/34
[52] U.S. Cl. .......................... 250/231 SE; 250/237 G; 340/347 P
[58] Field of Search ...................... 250/231 SE, 237 G; 340/347 P; 356/395

[56] References Cited

U.S. PATENT DOCUMENTS

| | | | |
|---|---|---|---|
| 4,250,380 | 2/1981 | Iyeta .............................. | 250/231 SE |
| 4,342,909 | 8/1982 | Accattino ....................... | 250/231 SE |
| 4,496,835 | 1/1985 | Boella et al. .................. | 250/231 SE |
| 4,507,647 | 3/1985 | Minami et al. ................. | 340/347 P |
| 4,529,964 | 7/1985 | Minami et al. ................. | 250/231 SE |

*Primary Examiner*—Edward P. Westin
*Attorney, Agent, or Firm*—Fidelman, Wolffe & Waldron

[57] ABSTRACT

A method and apparatus for measuring a minute linear or rotational displacement of a linearly movable or rotary member relative to a stationary member, wherein the stationary member is provided with a plurality of photodetectors arranged at regular linear or angular intervals along a predetermined linear or circular length D, and the linearly movable or rotary member is provided with a plurality of narrow slots arranged at regular linear or angular intervals along the same linear or circular length as the above-mentioned linear or circular length. The length D on the stationary member is equally divided by n, which is a positive integer, and each of the photodetectors is positioned at one of the dividing points or positions. The length D on the linearly movable or rotary member is equally divided by n±m, where m is a positive number sufficiently smaller than n, and each of the slots is positioned at one of the dividing points or positions. The two members face each other across a small gap and are so arranged that when illuminated through the slots, the photodetectors receive successively different amounts of light and consequently produce outputs of successively different levels. When plotted against the successive positions of the photodetectors in the linear or circular arrangement, the outputs form a wave, the phase of which changes greatly upon minute linear or rotational displacement of the two members with the slots and photodetectors thereon relative to each other. The linear or rotational displacement is measured by measuring the phase change, and a very high degree of accuracy of measurement is attained by statistically processing the outputs of the photodetectors. The slots and the photodetectors may be replaced by any other suitable elements which interact with each other to produce a variable amount of information.

8 Claims, 5 Drawing Figures

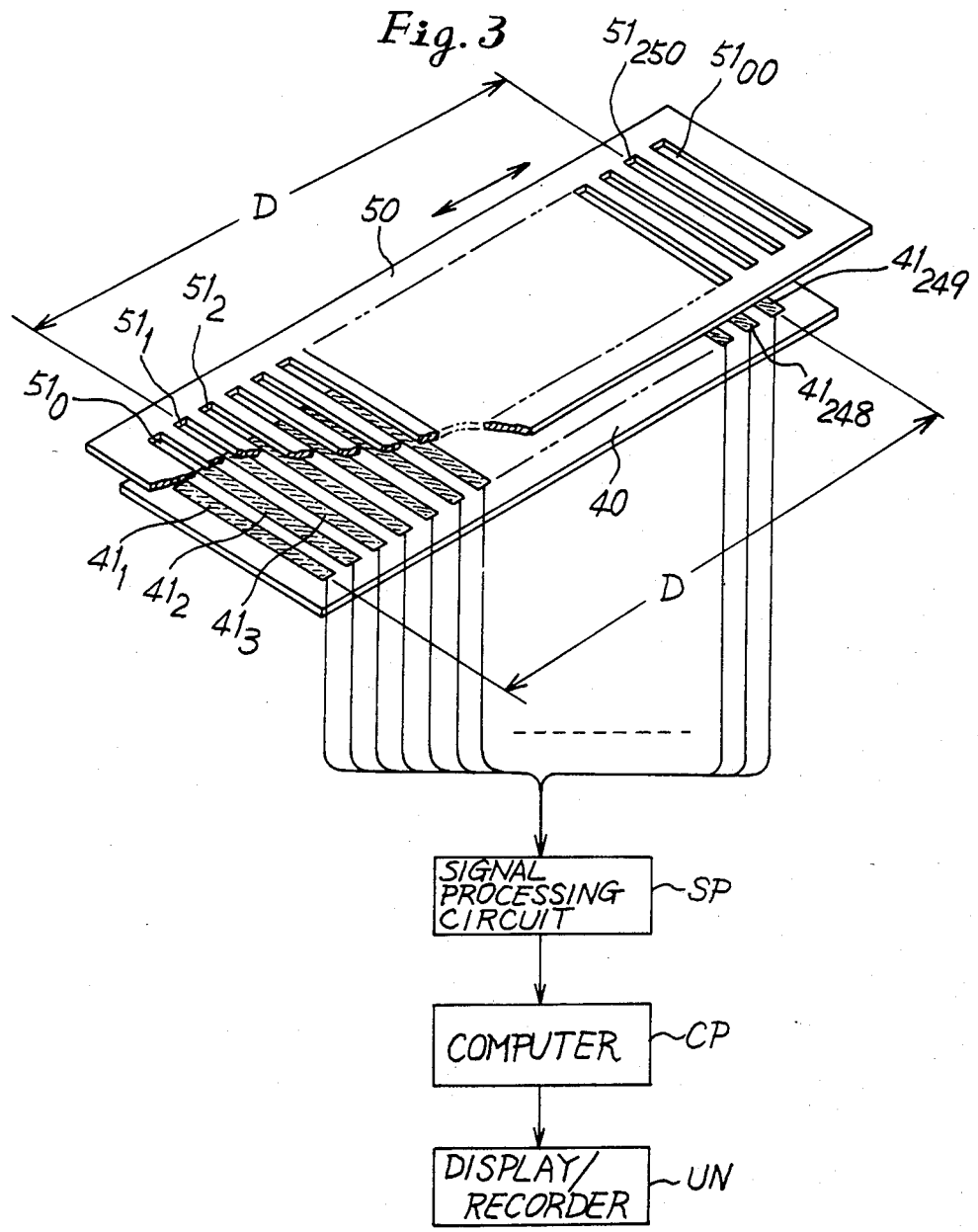

4,654,524

METHOD AND APPARATUS FOR MEASURING A DISPLACEMENT OF ONE MEMBER RELATIVE TO ANOTHER USING A VERNIER WITH AN EVEN NUMBERED DIFFERENCE OF ELEMENTS

BACKGROUND OF THE INVENTION

This invention relates to a method and an apparatus for measuring a displacement of one member relative to another, and more particularly to a method and an apparatus for measuring a minute rotational or linear displacement of a rotary or linearly movable member relative to a stationary member.

One known method of measuring a minute rotational angle of a rotary body employs a plurality of gears to mechanically magnify the rotational movement of the rotary body. This method, however, has a disadvantage that the mechanism for carrying out the method is complicated in structure and large in size. Another disadvantage is that the backlash, pitch error or runout of the magnifying gears causes errors in the the result of measurement.

Accordingly, it is one object of the invention to provide a method and apparatus for measuring a minute rotational angle of a rotary body, which is relatively simple and enables accurate measurement.

For measurement of a minute linear displacement such as strain caused by a stress in a body, there are known various methods such as the moiré0 fringe method and the laser interference method.

Another object of the invention is to provide a method and apparatus for measuring a minute linear displacement of an object, which is relatively simple and enables accurate measurement.

The invention will be described in detail with reference to the accompanying drawing.

BRIEF DESCRIPTION OF THE DRAWINGS

FIG. 3 is a somewhat schematic perspective view of a linearly movable plate and a stationary base plate used for measurement of linear displacement in accordance with another embodiment of the invention;

SUMMARY OF THE INVENTION

In accordance with the invention two members movable relative to each other are provided. One of the two members is provided with a first group of elements A arranged at regular intervals along a predetermined linear or circular length or distance D while the other of the two members is provided with a second group of elements B arranged at regular intervals along the same length or distance as the above-mentioned length D.

The length D on one of the two members is equally divided by n, and each of the elements A is positioned at one of the dividing points or positions of the length D. The length D on the other of the two members is equally divided by $n \pm m$, and each of the elements B is positioned at one of the dividing points or positions of the length D. Here, n is a positive integer while m is a positive number sufficiently smaller than n. When the length D is circular, m is also a positive integer. When the length D is linear, m may be not only a positive integer but also a fraction or a mixed number.

The two members are arranged so as to linearly or rotationally movable relative to each other and in such a manner that the elements A or B produce a successively different amount of information through interaction of the elements A and B.

The amounts of information provided by the elements A or B are plotted against the successive positions of the elements in the linear or circular arrangement to obtain a wave, the phase of which changes as the two members with their respective elements A and B thereon are displaced linearly or rotationally from each other. A very minute displacement of one of the two members relative to the other is magnified to produce a great change in the phase of the wave. By measuring the phase change it is possible to measure the relative displacement of the two members, and by statistically processing the amounts of information obtained from the elements it is possible to attain a very high degree of accuracy in the measurement without the necessity of employing complicated mechanical means.

DESCRIPTION OF THE PREFERRED EMBODIMENTS

Figure 1:
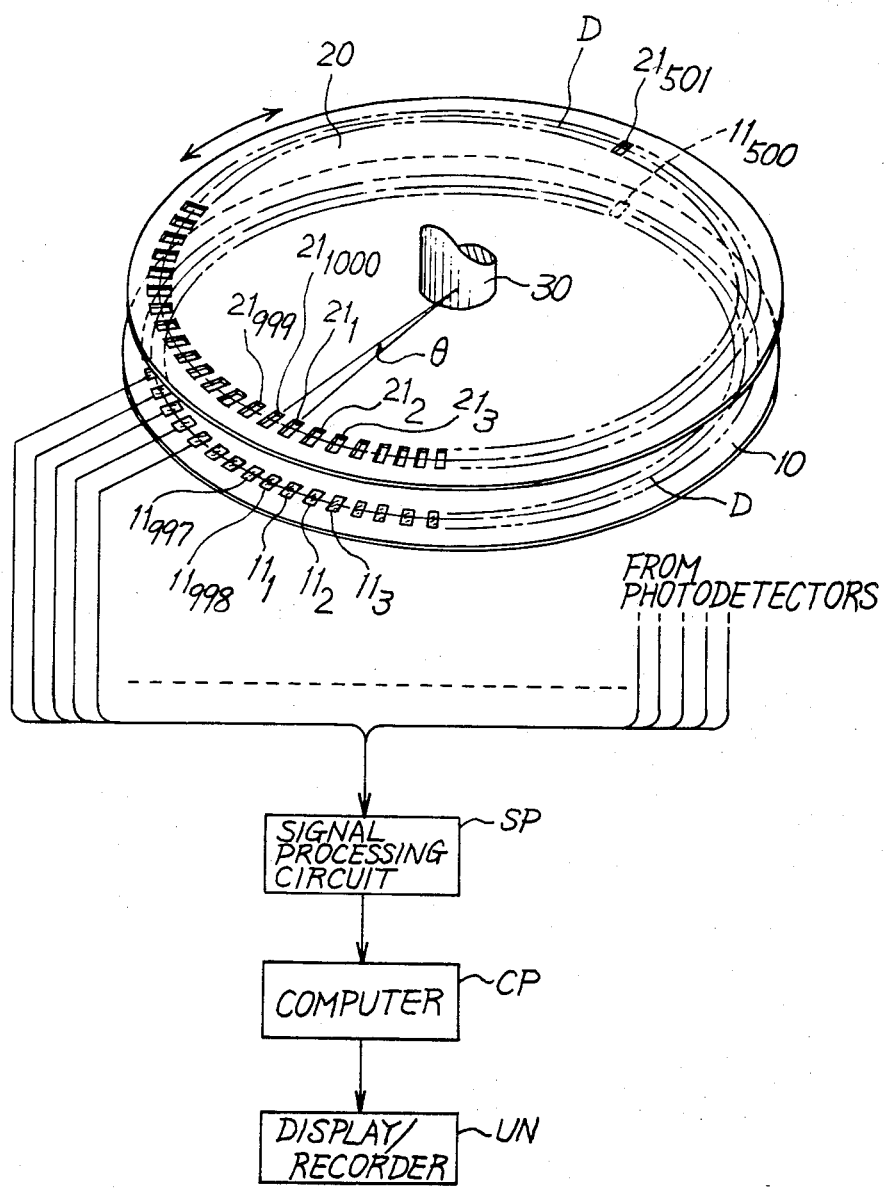
FIG. 1 is a somewhat schematic perspective view of a rotary disk and a stationary disk used for measurement of a rotational angle of a rotary member in accordance with one embodiment of the invention.

Referring to the drawings, first to FIG. 1, there is shown a stationary base plate or disk 10, on which a plurality, say, 998 elements A in the form of photodetectors $11_1$ to $11_{998}$ are circumferentially arranged adjacent the periphery of the disk and equidistantly spaced apart from each other. Facing the stationary disk 10 across a small gap is a rotary plate or disk 20, on which a plurality, say, 1000 elements B in the form of narrow openings or slots $21_1$ to $21_{1000}$ are formed along a circumference of the same radius as that along which the photodetectors are arranged on the stationary disk 10 and equidistantly spaced apart from each other. As can be easily seen, in the embodiment of FIG. 1 the previously mentioned number n is 998 while the number m is 2 (two).

In the following description, the photodetectors and the slots will be designated by the respective reference numerals 11 and 21 alone without the suffixed numerals except when they are required for identification of individual elements.

The disk 10 is held stationary by any suitable means while the rotary disk 20 is fixed to a rotatable shaft 30 for simultaneous rotation therewith.

Figure 2:
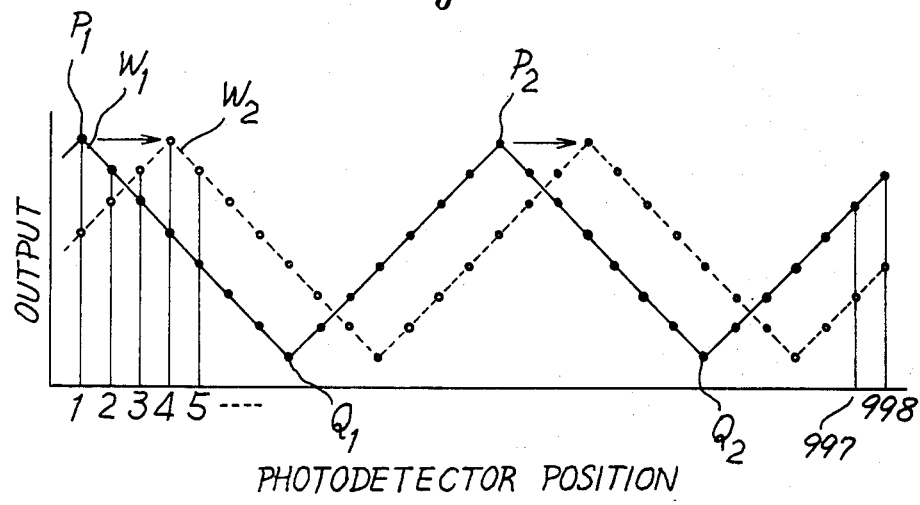
FIG. 2 is a waveform diagram for explanation of the operation of the device shown in FIG. 1.

A suitable light source not shown but provided above the rotary disk 20 projects parallel light rays on the disk 20 so that the photodetectors 11 on the stationary disk 10 receive the light passing through the slots 21 and produce outputs as shown by dots in FIG. 2, wherein the output of the photodetectors $11_1$ to $11_{998}$ is taken along the ordinate and their successive positions in the circumferential arrangement are designated by 1 to 998, respectively, along the abscissa.

As can be easily understood, if one of the 1000 slots 21 on the rotatable disk 20, say, the slot $21_1$ is vertically aligned with one of the 998 photodetectors 11 on the stationary disk 10, say, the photodetector $11_1$, the 501st slot $21_{501}$ diametrically opposite to the slot $21_1$ is vertically aligned with the 500th photodetector $11_{500}$ diametrically opposite to the photodetector $11_1$, so that the two photodetectors $11_1$ and $11_{500}$ receive the maximum amount of light passing through the respective slots $21_1$ and $21_{501}$, with the remaining slots being displaced a successively different distance from the photodetectors below, so that these photodetectors receive a successively different amount of light and produce an output of a successively different level. As a result, the outputs from the photodetectors 11 form a wave $W_1$ of two cycles having two maximum values $P_1$ and $P_2$ and two minimum values $Q_1$ and $Q_2$ alternate with the maximum values, as shown in FIG. 2.

When the rotary disk 20 is rotated for a minute angle relative to the stationary disk 10, the amount of light received by each of the photodetectors 11 changes, so that the outputs of the photodetectors 11 change as indicated by white circles in FIG. 2. This means that the phase of the wave $W_1$ is displaced or advances as shown by a broken line wave $W_2$ connecting the white circles. A small rotational displacement of the rotary disk 20 causes a great change in the phase of the wave formed by the outputs of successively different levels produced by the photodetectors 11.

In the illustrated embodiment, since the difference between the number of the slits 21 on the rotary disk 20 and that of the photodetectors 11 on the stationary disk 10 is two (1000−998=2), when the rotary disk 20 is rotated for one pitch in the circumferential arrangement of the slits 21 or an angle $\theta$ between adjacent two slits, the phase of the above-mentioned wave $W_1$ advances 180 degrees. Since there are 1000 slots arranged at equal angular intervals along the whole circumference of the rotary disk, the angle $\theta$ is 360°/1000. Therefore, the phase of the above-mentioned wave formed by the successively different, changing outputs of the photodetectors 11 changes 500 times the rotational angle $\theta$ of the rotary disk 20.

By statistically processing the outputs of the photodetectors 11 to obtain the value of maximum likelihood of the output of each of the photodetectors it is possible to calculate the phase of the above-mentioned wave formed by the outputs of the photodectors with an accuracy on the order of one-tenth of the pitch of the photodetectors.

For the above-mentioned statistical processing and calculation the outputs from the photodetectors 11 may be applied through a suitable signal processing circuit SP to an electronic computer CP. A display unit and/or a recorder UN may be provided to display and/or record the data provided by the computer.

Figure 5:
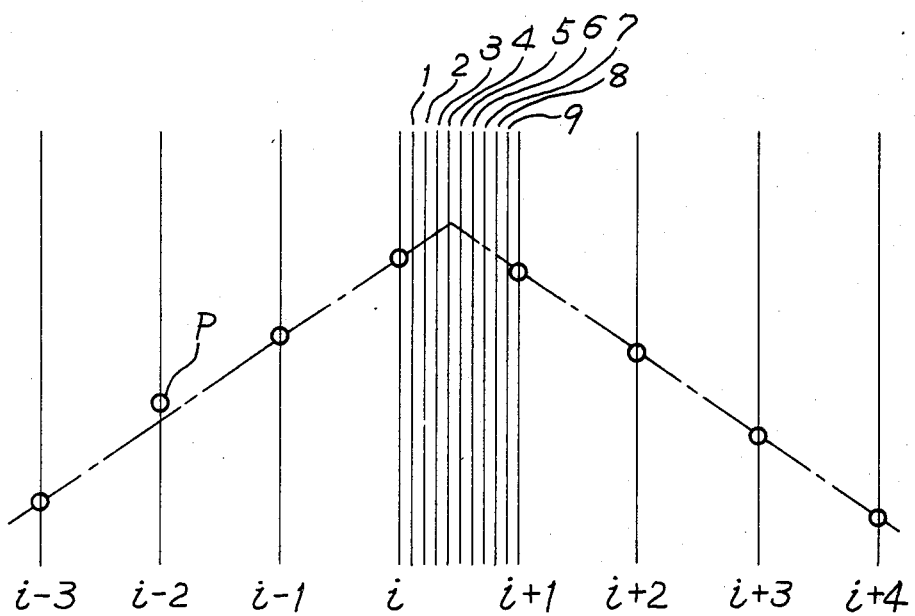
FIG. 5 is a waveform diagram showing a method of obtaining the position of maximum likelihood of the wave shown in FIGS. 2 or 4.

FIG. 5 shows a method of obtaining the position of maximum likelihood of the above-mentioned wave. In FIG. 5 in positions of some of the photodetectors 11 in the circumferential array on the stationary disk 10 are indicated by i−3, ..., i, ..., i+4 along the abscissa, and the output of the photodetectors is taken along the ordinate.

The pattern of the above-mentioned wave that appears with the highest probability, for example, the waveform shown by dot-and-dash line in FIG. 5 is obtained beforehand. By applying or comparing the above-mentioned pattern to a wave whose phase is to be measured it is possible to obtain the position of maximum likelihood of the wave. For example, even when the wave has a peak between the ith and (i+1)th photodetectors, where i is a positive integer, it is possible to calculate the phase of the wave formed by the successively different outputs of the photodetectors with an accuracy higher than one-tenth of the pitch of the photodetectors.

Even if the position of one of the photodetectors, for example, the (i−2)th photodetector happens to be displaced from its proper position due to some mechanical error so that the output of the photodetector is greater than its proper value as shown at p in FIG. 5, it is possible to estimate the proper value thereby to reduce any error in the calculated value of the phase caused by the mechanical error in the arrangement of the photodetectors.

The accuracy with which the rotational angle of the rotary disk 20 can be determined will now be explained with reference to concrete numerical values. In illustrated embodiment wherein 998 photodetectors are provided on the stationary disk 10 and 1000 slots are formed in the rotary disk 20, the displacement of the phase of the above-mentioned wave is magnified 500 times the rotational angle of the rotary disk 20, and the phase of the wave is determined by the statistically obtained values of maximum likelihood of the outputs of the 998 photodetectors, so that the accuracy of determination is higher than 360°/(998×10). Therefore, the rotational angle of the rotary disk 20 relative to the stationary disk 10 can be determined with an accuracy higher than 0.25", which is obtained from the following calculation:

$$(360° \times 60' \times 60'')/(500 \times 998 \times 10) \approx 0.25''$$

In the following embodiment, since the difference between the number of the photodetectors 11 and that of the slots 21 is an even number (2), the error which would be caused if the rotary disk 20 is eccentric with the stationary disk 10 is substantially reduced.

The base disk 10 may be formed by machining a larger circular plate and arrangeing a series of photodiodes or phototransistors on the plate circumferentially thereof. By forming a circular array of photodiodes on a base plate by the technique of producing semiconductive elements it is possible to make the base disk 10 very small and compact. The rotary disk 20 may be formed by coating a thin glass plate with a thin opaque film and forming a circular array of slots by photoetching.

Turning now to FIG. 3, which shows a second embodiment of the invention, there is shown a stationary base plate 40, on which a plurality, say, 249 elements A in the form of photodetectors $41_1$ to $41_{249}$ are equidistantly arranged along a linear length or distance D of, say, 25 mm. Facing the base plate 40 across a small gap is a movable plate 50, on which a plurality, say, 252 elements B in the form of narrow slots $51_0$, $51_1$, ..., $51_{250}$, $51_{00}$ are equidistantly arranged. Except for the first and last slots $51_0$ and $51_{00}$ on the opposite sides the other 250 slots $51_1$ to $51_{250}$ are arranged along the same length as the above-mentioned length D on the stationary plate 40, that is, 25 mm. It will be easily seen that in the embodiment of FIG. 3 the previously mentioned number n is 248 and the number m is 1 (one).

For simplicity of description the photodetectors and slots will be designated by only the respective reference numerals 41 and 51 without the suffixed numerals except when required for identification of the individual elements.

The base plate 40 is held stationary while the movable plate 50 is fixed to a linearly movable member, not shown, for simultaneous linear movement therewith.

Figure 4:
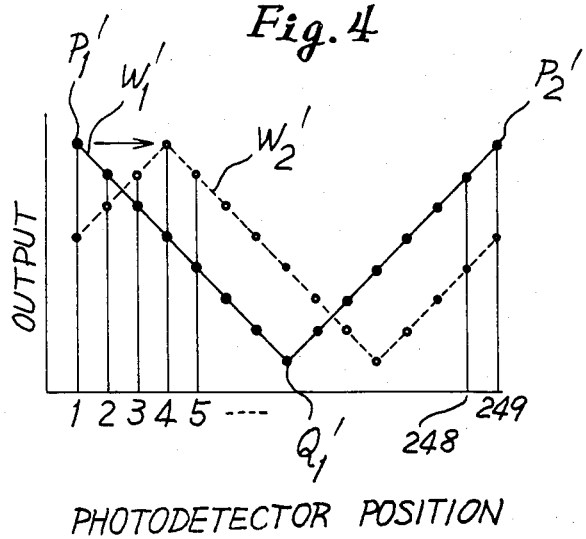
FIG. 4 is a waveform diagram for explanation of the operation of the device shown in FIG. 3.

A suitable light source not shown but provided above the movable plate 50 projects parallel light rays on the plate 50 so that the photodetectors 41 on the base plate 40 receive the light passing through the slots 51 and produce outputs as shown by dots in FIG. 4, wherein the output of the photodetectors is taken along the ordinate and the position of the photodetectors, along the abscissa as in FIG. 2.

As can be easily understood, when the two slots $51_1$ and $51_{250}$ in the linear array of slots are vertically aligned with the photodetectors $41_1$ and $41_{249}$, respectively, at the opposite ends of the linear array of photodetectors, the two photodetectors $41_1$ and $41_{249}$ receive the maximum amount of light passing through the respective slots $51_1$, and $51_{250}$, with the remaining slots $51_2$ to $51_{249}$ being displaced a successively different horizontal distance from the photodetectors $41_2$ to $41_{248}$ below, so that these photodetectors receive a successively different amount of light and produce an output of a successively different level. As a result, the outputs from the photodetectors 51 form a wave $W_1'$ of one cycle having two maximum values $P_1'$ and $P_2'$ at opposite ends and one minimum value $Q_1'$ at the center as shown in FIG. 4.

When the movable plate 50 is linearly moved a minute horizontal distance relative to and in parallel with the stationary plate 40, the amount of light received by each of the photodetectors 41 changes, so that the outputs of the photodetectors 41 change as indicated by white circles. This means that the phase of the wave $W_1'$ is displaced or advances as shown in FIG. 4 by a broken line wave $W_2'$ connecting the white circles. A small linear displacement of the movable plate 50 causes a great change in the phase of the wave formed by the outputs of successively different levels produced by the photodetectors 41.

In the illustrated embodiment, since the difference between the number of the slots $51_1$ to $51_{250}$ on the movable plate 50 and that of the photodetectors $41_1$ to $41_{249}$ on the stationary plate 40 within the same distance D is one (1), when the movable plate 50 is moved one pitch of the linear arrangement of the slots 51 or 0.1 mm, the phase of the above-mentioned wave $W_1'$ advances a distance corresponding to one wavelength, that is, 25 mm.

By statistically processing the outputs of the photodetectors 41 to obtain the position of maximum likelihood of the output of each of the photodetectors it is possible to calculate the phase of the above-mentioned wave formed by the outputs of the photodetectors with an accuracy higher than one-tenth of the pitch of the photodetectors. Such statistical processing and calculation may be conducted by an electronic computer CP as in the previously described first embodiment of the invention.

The position of maximum likelihood of the above-mentioned wave formed by the outputs of the photodetectors 41 may be obtained by substantially the same method as that which was previously explained with reference to FIG. 5 in the first embodiment of the invention.

It is also possible to reduce any error in the calculated value of the phase caused by the mechanical error in the arrangement of the photodetectors just as in the first embodiment of the invention.

The accuracy with which the linear displacement of the movable plate 50 can be determined will now be explained with reference to concrete numerical values.

In the illustrated embodiment wherein 249 photodetectors 41 are provided along a predetermined length D on the stationary plate 40 and 250 slots 51 are formed along the same length D in the movable plate 50, the displacement of the phase of the above-mentioned wave is magnified 250 times the linear displacement of the movable plate 50, and the phase of the wave is determined by the statistically obtained values of maximum likelihood of the outputs of the 249 photodetectors, so that the accuracy of determination is higher than 25 mm/(249×10). Therefore, the linear displacement of the movable plate 50 relative to the stationary plate 40 can be determined with an accuracy higher than 0.04 μm, which is obtained from the following calculation:

$$25 \text{ mm}/(250 \times 249 \times 10) \approx 0.04 \text{ μm}$$

The base plate 40 can be a plate provided with a linear array of photodiodes formed by the technique of producing semiconductor elements. The movable plate 50 may be formed by coating a thin glass plate with a thin opaque film and forming therein a linear array of slots by photoetching.

In the illustrated embodiments of the invention, the elements A arranged on the stationary plate 40 or the stationary disk 10 are photodetectors and the elements B on the linearly movable plate 50 or the rotary disk 20 are narrow slots. The elements A and B may be replaced by any other suitable elements which interact with each other. For example, the elements A and B may be electrodes, the electrostatic capacity between which is measured. The elements A may also be magnetic detectors such as Hall elements while the elements B may be north or south magnetic poles.

In the illustrated embodiments the difference m between the number n+m of the slots and the number n of the photodetectors provided within the same length D is one (1) in FIG. 3 or two (2) in FIG. 1. The difference m may also be three (3) or more than three. By selecting the difference it is possible to change the magnification in measurement.

If the length D is circular as in the embodiment of FIG. 1, the number m is a positive integer. If the length D is linear as in the embodiment of FIG. 3, the number m is not only an integer but also a fraction or a mixed number. In either case, the number n is a positive integer.

In accordance with the invention, since it is not necessary to mechanically magnify the linear or rotational movement of the linearly movable or rotary member, the measuring instrument can be made simple in structure and compact in size. The instrument is free from mechanical errors caused by, say, the backlash of gears or play between connected members, so that accurate and precise measurement of linear or rotational displacement is ensured.

If both the stationary member 10 or 40 and the rotary member 20 or the linearly movable member 50 are made of a material having the same coefficient of thermal expansion, any thermal expansion of one of the two members is offset by a corresponding thermal expansion of the other, so that the errors which would otherwise be caused by temperature change to the results of measurement can be substantially eliminated thereby to improve the accuracy of measurement.

In accordance with the invention, since the successively different amounts of information provided by the elements such as the photodetectors are statistically processed, by using, for example, a regression line it is possible to compensate for errors caused by inaccurate arrangement of the mechanical positions of the elements and/or difference in sensitivity between the individual elements.

What I claim is:

1. A method of measuring a displacement of one member relative to another, comprising the steps of:

providing a first member having n elements A arranged at equal angular intervals along a circular path having a first circumference, second member having n±m elements B arranged at equal angular intervals along a circular path having a second circumference generally coaxial with and equal to said first circumference wherein n is a positive integer and m is an even positive integer smaller than n sufficiently to magnify a phase change of a wave pattern by at least one order of magnitude;

arranging said first and second members so as to be rotatable relative to each other and in such a cooperative relation to produce said wave pattern as an output defined by a successively different amount of information according to relative movement between said elements A and B;

obtaining from said amounts of information said wave pattern which changes in phase upon relative rotation between said first and second members;

measuring said phase changes of said wave pattern thereby to measure said relative rotation;

statistically processing said amounts of information so as to provide a pattern of maximum likelihood of said wave;

comparing said pattern of maximum likelihood with said wave pattern; and compensating for errors in said measuring, according to said comparing, said errors being caused by such as differences in sensitivities between elements of one of said first and second members, inaccuracies in mechanical positioning of at least one of said elements, and eccentricity between said circular paths.

2. The method of claim 1, wherein said elements of one of said first and second members are magnetic detectors and said elements of the other of said first and second members are magnetic poles.

3. The method of claim 1, wherein said elements A are photodetectors and said elements B are narrow slots.

4. The method of claim 1, wherein said elements A and B are electrodes, and further comprising the step of measuring an electrostatic capacity between said electrodes.

5. An apparatus for measuring a displacement of one member relative to another, comprising:

a first member having n elements A arranged at equal angular intervals along a circular path having a first circumference, and a second member having n±m elements B arranged at equal angular intervals along a circular path having a second circumference generally coaxial with and equal to said first circumference wherein n is a positive integer and m is an even positive integer;

said first and second members being arranged and rotatable relative to each other and in such a cooperative relation to produce a wave pattern as an output defined by a successively different amount of information according to relative movement between said elements A and B, whereby said wave pattern changes in phase upon relative rotation between said first and second members;

means for measuring said phase changes of said wave pattern thereby to measure the amount of said relative rotation;

means for statistically processing said amounts of information so as to provide a pattern of maximum likelihood of said wave;

means of comparing said pattern of maximum likelihood with said wave pattern; and means for compensating for errors in said measuring, according to said comparing, said errors being caused by such as differences in sensitivities between elements of one of said first and second members, inaccuracies in mechanical positioining of at least one of said elements, and eccentricity between said circular paths.

6. The apparatus of claim 5, wherein said elements of one of said first and second members are magnetic detectors and said elements of the other of said first and second members are magnetic poles.

7. The apparatus of claim 5, wheren said elements A are photodetectors and said elements B are narrow slots.

8. The apparatus of claim 5, wherein said elements A and B are electrodes, and further comprising means for measuring an electrostatic capacity between said electrodes.

* * * * *